Patented Dec. 25, 1945

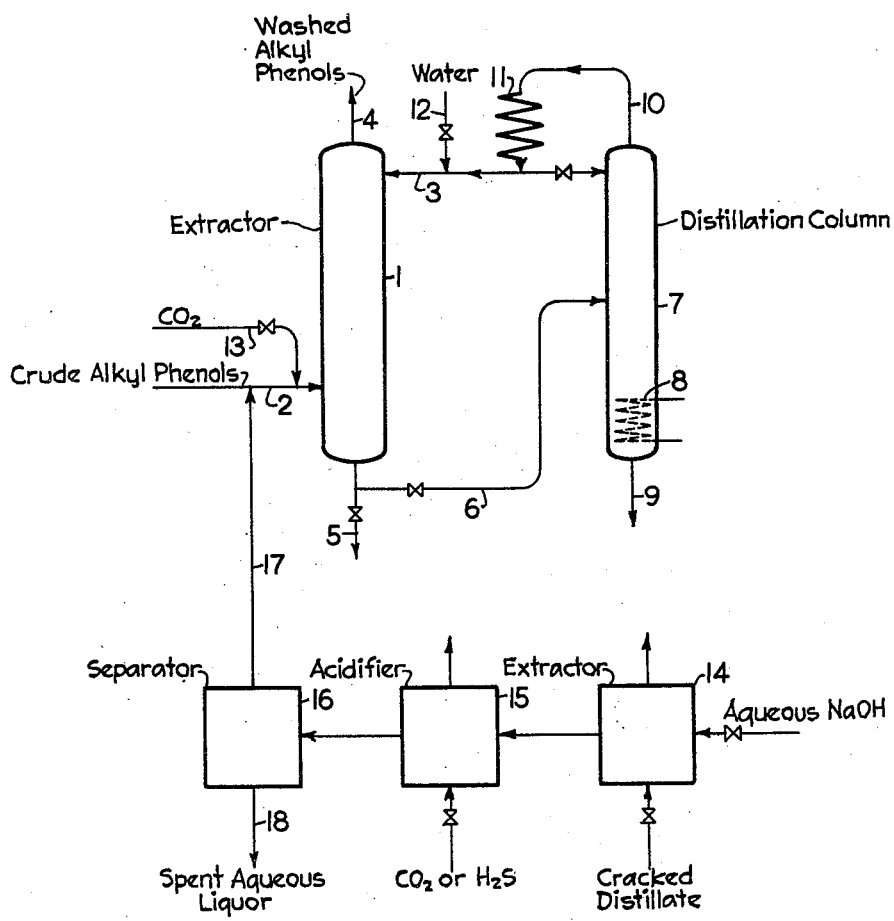

2,391,839

UNITED STATES PATENT OFFICE 2,391,839

TREATMENT OF ALKYL PHENOLS

Clifford T. Magin, Los Angeles, and Lloyd C. Fetterly, Long Beach, Calif., assignors to Shell Development Company, San Francisco, Calif., a corporation of Delaware Application August 23, 1943, Serial No. 499,726

9 Claims. (Cl. 260—621)

This invention deals with the removal of moisture from crude alkyl phenols, and more particularly is concerned with a method comprising a water wash to achieve this purpose.

Alkyl phenols are recovered from petroleum or coal tar distillates by treating them with strong aqueous caustic alkali such as 25 to 45° Bé. sodium or other alkali metal hydroxide to produce an aqueous sodium phenolate solution. From this aqueous solution, the alkyl phenols are then sprung with an acid stronger than the phenols, usually by treatment with $CO_2$ or $H_2S$. The crude alkyl phenols thereupon separate and may be recovered. This procedure is fully described in Hund et al., U. S. 2,163,227. The alkyl phenols so recovered usually contain water ranging anywhere from about 10% to 50%. Most of this water, it has been found, is in true solution and therefore is not separable by settling, centrifuging or the like.

It is a purpose of this invention to provide a simple method for materially reducing water dissolved in crude alkyl phenols. Another purpose is to achieve this result by simply water washing and settling. Still another purpose is to reduce the salt content of the alkyl phenols, salts interfering with the distillation of the alkyl phenols materially reducing the throughput through available distilling equipment.

We have discovered that crude alkyl phenols normally contain certain substances which are responsible for the large amounts of water dissolved in them. These substances, it has been found, are alkali metal salts of carboxylic acids such as fatty acids, naphthenic acids, etc., normally contained in hydrocarbon oils from which the alkyl phenols are recovered. These acids are extracted by the caustic alkali together with the alkyl phenols, and thus form part of the alkyl phenolate solution resulting from the extraction. Upon acidifying the solution with $H_2S$ or $CO_2$, as is customary, the alkyl phenols are liberated, but the carboxylic acids are not. Due to the ready solubility of the resulting carboxylates in the liberated alkyl phenols as well as in water, the carboxylates are distributed between the aqueous and alkyl phenol phases. As a result, the separated alkyl phenols contain substantial proportions of these carboxylates. Again, because of ready water solubility of these carboxylates, they act as solutizers for water in the alkyl phenols. As a result, the crude alkyl phenols which do contain substantial amounts of these carboxylates also contain a substantial amount of dissolved water.

This invention thus comprises washing the crude alkyl phenols containing dissolved carboxylates and water, with about 1 to 10 volumes and preferably about 3 to 5 volumes of water, to wash out the carboxylates, allowing the resulting mixture to separate and removing the water containing at least a portion of the carboxylate. A single wash reduces the water content normally by about 50% to 75%.

The washing temperature may be any convenient temperature below the boiling temperature of water, preferably about 140° F. to 190° F., although normal atmospheric temperatures are quite suitable.

Occasionally emulsions occur between the crude alkyl phenols and the wash water. This may happen if the pH value of the mixture is above about 9 or 9.5 on account of the content of alkali metal carboxylates. Such emulsions can readily be broken by reducing the pH value of the alkyl phenols or the aqueous emulsions containing them to below about 9.5 and preferably to between 7 and 9. A simple way of achieving this is by blowing $CO_2$ through the mixture while contacting the crude alkyl phenols with the wash water or by adding a measured amount of a stronger acid such as $H_2SO_4$, HCl, $H_3PO_4$, etc., either before or during contact with the wash water.

After completed contact, the mixture of alkyl phenols and water is merely settled, or may be centrifuged. The water contains at least a substantial portion of the carboxylates originally contained in the crude alkyl phenols and upon settling, the water content of the alkyl phenols is materially lower than that prior to the water wash. If desired, the water washing may be repeated, thereby further reducing the water content of the alkyl phenols.

The washing may be carried out in batch, for example, in an agitator using air, $CO_2$, flue gas, or mechanical agitation; or continuously, for example in a packed tower. Continuous countercurrent washing is very suitable.

The separated water from the treatment containing carboxylates also contains a small amount of phenols. In order to recover the latter, the wash water may be fractionally distilled to take overhead, say from 5% to 30%, preferably about 20%, of the water. The alkyl phenols accumulate in the overhead which may be condensed and recirculated to the washing step.

The process is illustrated in the attached drawing, which represents a simplified flow diagram. Referring to the drawing, the crude alkyl phenols containing dissolved water and carboxylates enter a wash tower 1 through line 2 near the bottom of the tower. Wash water is introduced near the top of the tower through line 3 to flow countercurrently to the ascending phenols. Washed alkyl phenols emerge from the top of the wash tower through line 4, while the spent wash water is withdrawn through bottom line 5 and may be discarded.

If desired, the spent water may instead be conveyed through line 6 to distillation column 7 equipped with reboiler 8 at its bottom. In this distillation column, the water may be distilled to take overhead a minor portion thereof. Undistilled residue containing dissolved carboxylates is withdrawn through bottom line 9, while the vapors pass out through vapor line 10 and are condensed in condenser 11. Condensate is in part returned to the distillation column 7 as reflux, and the remainder is returned through line 3 to the top of washing column 1. Fresh water to make up for the water withdrawn from the bottom of the distillation column 7 is introduced into line 3 through line 12.

If the alkyl phenols introduced through line 2 into extractor 1 have a pH value above about 9 or 9.5, $CO_2$ is advantageously injected through line 13.

While crude alkyl phenols from any source may thus be treated, this process is particularly applicable to those recovered by a method which is illustrated schematically in the drawing. Cracked distillate containing alkyl phenols is extracted with strong aqueous sodium hydroxide in an extractor 14 and the resulting aqueous sodium phenolate solution is acidified in acidifier 15 with $CO_2$ or $H_2S$. The acidified aqueous solution is then allowed to separate in separator 16 where two layers are formed, an alkyl phenol layer and an aqueous liquor. The alkyl phenol layer passes through lines 17 and 2 to extractor 1, while the spent aqueous liquor is discarded through line 18.

For the sake of simplicity, storage tanks, pumps, by-passes, valves and other auxiliary equipment, which are within the skill of the designer of such equipment, have not been shown.

The following examples further illustrate the efficacy of the treatment. Various crude alkyl phenols were contacted with water while blowing with air or $CO_2$ for 15 minutes, and the resulting mixture was then allowed to settle for 4 hours. Other conditions and results of the treatment are tabulated below:

| Water content, percent | | Temperature, °F. | Volume of water | pH of washed mixture |
|---|---|---|---|---|
| Before washing | After washing | | | |
| 17.2 | (¹) | 80 | 300 | 9.7 |
| 20.0 | 9.2 | 80 | 300 | |
| 20.0 | 6.4 | 180 | 300 | 8.8 |
| 43.0 | 11.0 | 180 | 400 | 8.0 |

¹ Emulsified.

We claim as our invention:

1. A process for removing dissolved water from alkyl phenols containing it and water-soluble carboxylic acid salts comprising thoroughly contacting said alkyl phenols with from about 1 to 10 volumes of water under conditions to produce a mixture having a pH value below about 9.5 and separating from the mixture an alkyl phenol phase of substantially lower water content than said starting alkyl phenols and an aqueous phase containing at least a part of said carboxylic acid salts.

2. The process of claim 1, wherein the amount of water is between 3 and 5 volumes.

3. The process of claim 1, wherein the pH value is between about 7 and 9.

4. A process for removing dissolved water from alkyl phenols containing it and water-soluble alkali metal carboxylates comprising thoroughly contacting said alkyl phenols with from about 1 to 10 volumes of water, acidifying the resulting mixture to reduce its pH value to below about 9.5, allowing the mixture to separate into an alkyl phenol phase of substantially lower water content than said starting alkyl phenols and an aqueous phase containing at least a part of said alkali metal carboxylates, and removing separated water from the alkyl phenols.

5. A process for removing dissolved water from alkyl phenols containing it and water-soluble carboxylic acid salts comprising thoroughly contacting said alkyl phenols with from about 1 to 10 volumes of water while passing $CO_2$ through the resulting mixture, allowing the mixture to separate into an alkyl phenol phase of substantially lower water content than said starting alkyl phenols and an aqueous phase and removing separated water from the alkyl phenols.

6. A process for removing dissolved water from alkyl phenols containing it and sufficient water-soluble alkali metal carboxylates to result in a pH value of the alkyl phenols above about 9.5, comprising the steps of thoroughly contacting said alkyl phenols with from about 1 to 10 volumes of water, adding an amount of an acid stronger than the phenols to reduce the pH value to between 7 and 9, allowing the mixture to separate into an alkyl phenol phase of substantially lower water content than said starting alkyl phenols and an aqueous phase, and removing separated water.

7. In the process of producing alkyl phenols of relatively low water content by extracting them from hydrocarbon oils with strong aqueous alkali metal hydroxide and liberating them from the resulting alkyl phenolate solution by acidification with $CO_2$ or $H_2S$, the steps of thoroughly contacting said liberated alkyl phenols with from about 1 to 10 volumes of water under conditions to produce a mixture having a pH value below about 9.5 and separating said mixture into an alkyl phenol phase of substantially lower water content than said liberated alkyl phenols and an aqueous phase and removing the thus separated water from the alkyl phenols.

8. A process for removing dissolved water from alkyl phenols containing it and water soluble carboxylic acid salts comprising thoroughly contacting said alkyl phenols with from about 1 to 10 volumes of water under conditions to produce a mixture having a pH value below about 9.5, allowing the mixture to separate into an alkyl phenol phase of substantially lower water content than said starting alkyl phenols and an aqueous phase, removing separated water containing at least a portion of said carboxylates and a small amount of phenols, fractionally distilling said water to take overhead a minor portion of said water containing the major part of said small amount of phenols, condensing the resulting vapors and returning the condensate for further contact with alkyl phenols.

9. The process of claim 8, wherein said minor portion of water is from 5% to 30%.

CLIFFORD T. MAGIN.
LLOYD C. FETTERLY.